United States Patent
Lin et al.

(10) Patent No.: US 11,961,206 B2
(45) Date of Patent: Apr. 16, 2024

(54) IMAGE GENERATION USING NON-LINEAR SCALING AND TONE-MAPPING BASED ON CUBIC SPLINE CURVES

(71) Applicant: Samsung Electronics Co., Ltd., Suwon-si (KR)

(72) Inventors: Kaimo Lin, Plano, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 160 days.

(21) Appl. No.: 17/651,226

(22) Filed: Feb. 15, 2022

(65) Prior Publication Data
US 2023/0073970 A1   Mar. 9, 2023

Related U.S. Application Data

(60) Provisional application No. 63/242,345, filed on Sep. 9, 2021.

(51) Int. Cl.
*G06T 3/40*   (2006.01)
*G06T 3/4015*   (2024.01)
(Continued)

(52) U.S. Cl.
CPC .......... *G06T 3/4015* (2013.01); *G06T 5/009* (2013.01); *H04N 23/73* (2023.01); *H04N 23/951* (2023.01)

(58) Field of Classification Search
CPC ............... G06T 3/4015; G06T 5/009; G06T 2207/20208; G06T 2207/20221;
(Continued)

(56) References Cited

U.S. PATENT DOCUMENTS 6,888,552 B2 * 5/2005 Debevec .............. G11B 27/034
                                                            345/589
8,606,042 B2 * 12/2013 Yadav .................... G06T 5/008
                                                            382/167
(Continued)

FOREIGN PATENT DOCUMENTS

CN     110246086 A     9/2019
CN     112215760 A     1/2021
(Continued)

OTHER PUBLICATIONS

International Search Report and Written Opinion of the International Searching Authority dated Nov. 11, 2022 in connection with International Patent Application No. PCT/KR2022/012041, 10 pages.

*Primary Examiner* — Motilewa Good-Johnson (57) ABSTRACT

A method includes obtaining a Bayer input image. The method also includes generating, using at least one processing device of an electronic device, multiple YUV image frames based on the Bayer input image using non-linear scaling, where the YUV image frames are associated with different exposure settings. The method further includes generating, using the at least one processing device of the electronic device, a fused image based on the YUV image frames. In addition, the method includes applying, using the at least one processing device of the electronic device, global tone-mapping to the fused image in order to generate a tone-mapped fused image, where the global tone-mapping is based on a first cubic spline curve.

20 Claims, 7 Drawing Sheets

(51) Int. Cl.
  *G06T 5/00* (2006.01)
  *H04N 23/73* (2023.01)
  *H04N 23/951* (2023.01)

(58) Field of Classification Search
  CPC ........ G06T 5/50; H04N 23/73; H04N 23/951; H04N 23/741; H04N 23/82
  See application file for complete search history.

(56) References Cited

U.S. PATENT DOCUMENTS

| | | | |
|---|---|---|---|
| 9,247,153 | B2 | 1/2016 | Umezu |
| 9,307,212 | B2 * | 4/2016 | Vranceanu ............ H04N 9/646 |
| 9,420,256 | B2 | 8/2016 | Chen et al. |
| 9,883,112 | B1 * | 1/2018 | Igor' .................... H04N 25/13 |
| 10,341,574 | B2 | 7/2019 | Cote et al. |
| 10,699,393 | B2 | 6/2020 | Shohara |
| 10,911,691 | B1 * | 2/2021 | Le .......................... G06T 5/002 |
| 10,944,914 | B1 * | 3/2021 | Le ......................... H04N 25/62 |
| 11,182,884 | B2 | 11/2021 | Deng et al. |
| 11,323,666 | B1 * | 5/2022 | Andersen ............ H04N 25/135 |
| 11,637,963 | B2 | 4/2023 | Lee et al. |
| 2003/0002095 | A1 | 1/2003 | Gruzdev et al. |
| 2013/0202203 | A1 * | 8/2013 | Bryant ................. G06T 11/001<br>382/167 |
| 2013/0258136 | A1 * | 10/2013 | Lee ...................... H04N 1/2145<br>348/231.99 |
| 2015/0334283 | A1 * | 11/2015 | Vranceanu ................ G06T 5/50<br>348/239 |
| 2016/0093029 | A1 * | 3/2016 | Micovic ................... G06T 5/50<br>348/229.1 |
| 2016/0125630 | A1 * | 5/2016 | Narahari ................ G06T 5/003<br>382/167 |
| 2018/0103230 | A1 * | 4/2018 | Vitta .................... H04N 19/164 |
| 2019/0171853 | A1 * | 6/2019 | Gao ...................... H04N 1/407 |
| 2019/0362476 | A1 * | 11/2019 | Pytlarz .................... G06T 5/009 |
| 2020/0066003 | A1 * | 2/2020 | Baldwin ............... G06T 11/001 |
| 2020/0265567 | A1 * | 8/2020 | Hu .......................... G06T 5/007 |
| 2020/0286213 | A1 * | 9/2020 | Unger .................. H04N 1/6027 |
| 2020/0396370 | A1 * | 12/2020 | Zhen ......................... G06T 5/40 |
| 2021/0035273 | A1 | 2/2021 | Deng et al. |
| 2021/0067703 | A1 * | 3/2021 | Kadambala ............ H04N 23/71 |
| 2021/0076042 | A1 | 3/2021 | Choudhury et al. |
| 2021/0166437 | A1 * | 6/2021 | LeGendre ................ G06T 19/20 |
| 2021/0235045 | A1 * | 7/2021 | Shukla .................. H04N 25/447 |
| 2021/0272251 | A1 | 9/2021 | Unger et al. |
| 2022/0021802 | A1 * | 1/2022 | Le ......................... H04N 23/951 |
| 2022/0224820 | A1 * | 7/2022 | Liu ...................... H04N 25/531 |
| 2022/0237754 | A1 | 7/2022 | Yu et al. |
| 2022/0358627 | A1 * | 11/2022 | Deng ...................... G06T 5/009 |
| 2022/0377228 | A1 * | 11/2022 | Lim ...................... H04N 25/60 |
| 2022/0414847 | A1 * | 12/2022 | Kwon .................... G06T 5/007 |
| 2023/0042923 | A1 * | 2/2023 | Xu ........................... H04N 9/77 |

FOREIGN PATENT DOCUMENTS

| | | |
|---|---|---|
| JP | 2021117748 A | 8/2021 |
| WO | 2021073304 A1 | 4/2021 |

\* cited by examiner

IMAGE GENERATION USING NON-LINEAR SCALING AND TONE-MAPPING BASED ON CUBIC SPLINE CURVES

CROSS-REFERENCE TO RELATED APPLICATION AND PRIORITY CLAIM

This application claims priority under 35 U.S.C. § 119(e) to U.S. Provisional Patent Application No. 63/242,345 filed on Sep. 9, 2021. This provisional application is hereby incorporated by reference in its entirety.

TECHNICAL FIELD

This disclosure relates generally to imaging systems. More specifically, this disclosure relates to image generation using non-linear scaling and tone-mapping based on cubic spline curves.

BACKGROUND

Many mobile electronic devices, such as smartphones and tablet computers, include cameras that can be used to capture still and video images. While convenient, cameras on mobile electronic devices typically suffer from a number of shortcomings. For example, certain scenes being imaged using an electronic device often have a high dynamic range (HDR) that exceeds the capture range of one or more cameras of the electronic device. Because of this, a single digital image is often insufficient to provide all details in a scene due to the presence of under-exposed or over-exposed regions. To capture details about an entire scene, it is often necessary to capture multiple image frames using different exposure settings and to combine the image frames in order to produce an HDR image. Unfortunately, conventional approaches for combining image frames often produce images having noticeable imaging artifacts.

SUMMARY

This disclosure relates to image generation using non-linear scaling and tone-mapping based on cubic spline curves.

In a first embodiment, a method includes obtaining a Bayer input image. The method also includes generating, using at least one processing device of an electronic device, multiple YUV image frames based on the Bayer input image using non-linear scaling, where the YUV image frames are associated with different exposure settings. The method further includes generating, using the at least one processing device of the electronic device, a fused image based on the YUV image frames. In addition, the method includes applying, using the at least one processing device of the electronic device, global tone-mapping to the fused image in order to generate a tone-mapped fused image, where the global tone-mapping is based on a first cubic spline curve.

In a second embodiment, an apparatus includes at least one processing device configured to obtain a Bayer input image and generate multiple YUV image frames based on the Bayer input image using non-linear scaling, where the YUV image frames are associated with different exposure settings. The at least one processing device is also configured to generate a fused image based on the YUV image frames and apply global tone-mapping to the fused image in order to generate a tone-mapped fused image, where the global tone-mapping is based on a first cubic spline curve.

In a third embodiment, a non-transitory computer readable medium contains instructions that when executed cause at least one processor of an electronic device to obtain a Bayer input image and generate multiple YUV image frames based on the Bayer input image using non-linear scaling, where the YUV image frames are associated with different exposure settings. The medium also contains instructions that when executed cause the at least one processor generate a fused image based on the YUV image frames and apply global tone-mapping to the fused image in order to generate a tone-mapped fused image, where the global tone-mapping is based on a first cubic spline curve.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 9, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, mobile electronic devices, such as smartphones and tablet computers, include cameras that can be used to capture still and video images. While convenient, cameras on mobile electronic devices typically suffer from a number of shortcomings. For example, certain scenes being imaged using an electronic device often have a high dynamic range (HDR) that exceeds the capture range of one or more cameras of the electronic device. Because of this, a single digital image is often insufficient to provide all details in a scene due to the presence of under-exposed or over-exposed regions. To capture details about an entire scene, it is often necessary to capture multiple image frames using different exposure settings and to combine the image frames in order to produce an HDR image. Unfortunately, conventional approaches for combining image frames often produce images having noticeable imaging artifacts.

As particular examples of this, a Bayer input image may be converted into multiple YUV images, the YUV images may be processed and combined to produce an HDR YUV image, and the HDR YUV image may be converted into a compressed HDR Bayer output image. However, the YUV images are typically generated by applying linear scaling to the Bayer input image, and linear scaling may not be the ideal option in certain situations. For instance, a smaller scale factor may be used during shorter-exposure image frame synthesis for better HDR recovery, but this may create blending artifacts in a final image when darker regions of a shorter-exposure image frame are used during blending. Also, tone-mapping operations may cause a loss of detail in a final image unless care is taken during the tone-mapping operations. For example, when using a gamma curve during global tone-mapping, the gamma curve often focuses energy on either darker regions or brighter regions of an image frame, so it is not easy to control or make adjustments to global brightness or global contrast in the middle energy range of the gamma curve.

This disclosure provides techniques for image generation using non-linear scaling and tone-mapping. As described in more detail below, a Bayer input image may be obtained and used to generate multiple YUV images associated with different exposure settings. The YUV images may be generated using non-linear scaling, which in some embodiments may involve the use of cubic spline curves. The use of non-linear scaling can help to reduce the creation of blending artifacts when the YUV images are subsequently blended or otherwise fused to produce a fused image. Also, global tone-mapping may be performed using the fused image, and the global tone-mapping may be performed based on at least one cubic spline curve. The use of at least one cubic spline curve here can help to support simpler high-level tuning of the global tone-mapping, thereby allowing a user to more easily control or make adjustments to global brightness and/or global contrast (including in the middle energy range of the cubic spline curve). After the global tone-mapping, one or more additional operations may be performed to convert the resulting image into a tone-mapped Bayer output image, which can be stored, output, or used in any suitable manner. In this way, these techniques can be used to facilitate generation of Bayer output images having fewer artifacts, and global brightness and/or global contrast in the Bayer output images may be more easily controlled and adjusted by users.

Figure 1:
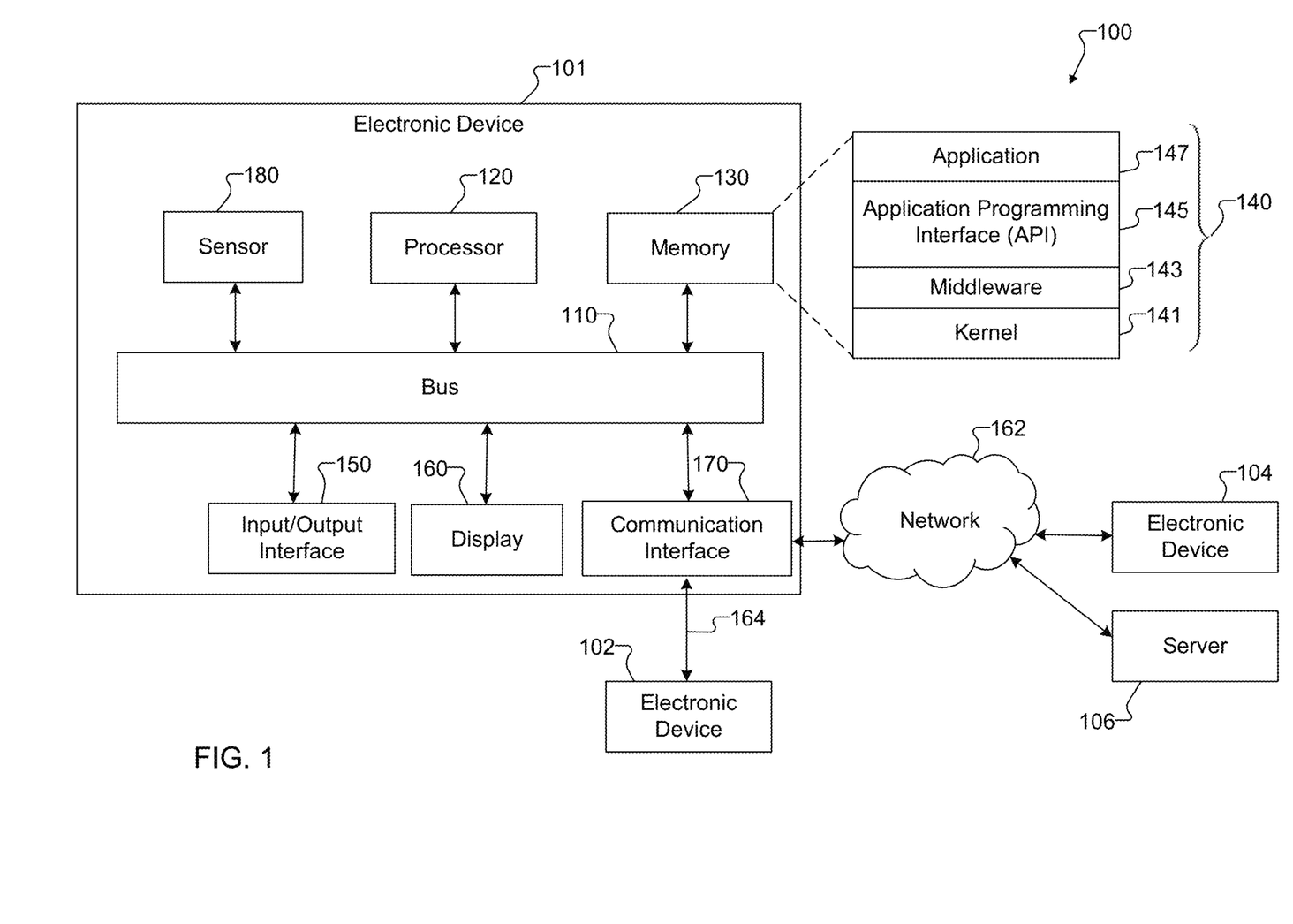
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). In some cases, the processor 120 can obtain and process Bayer input images or other input images in order to produce Bayer output images or other output images, where the output images are generated using non-linear scaling and tone-mapping operations (which may be based on cubic spline curves).

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for obtaining and processing input images in order to produce output images, where the output images are generated using non-linear scaling and tone-mapping operations as discussed below. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some cases, the server 106 can obtain and process Bayer input images or other input images in order to produce Bayer output images or other output images, where the output images are generated using non-linear scaling and tone-mapping operations (which may be based on cubic spline curves).

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
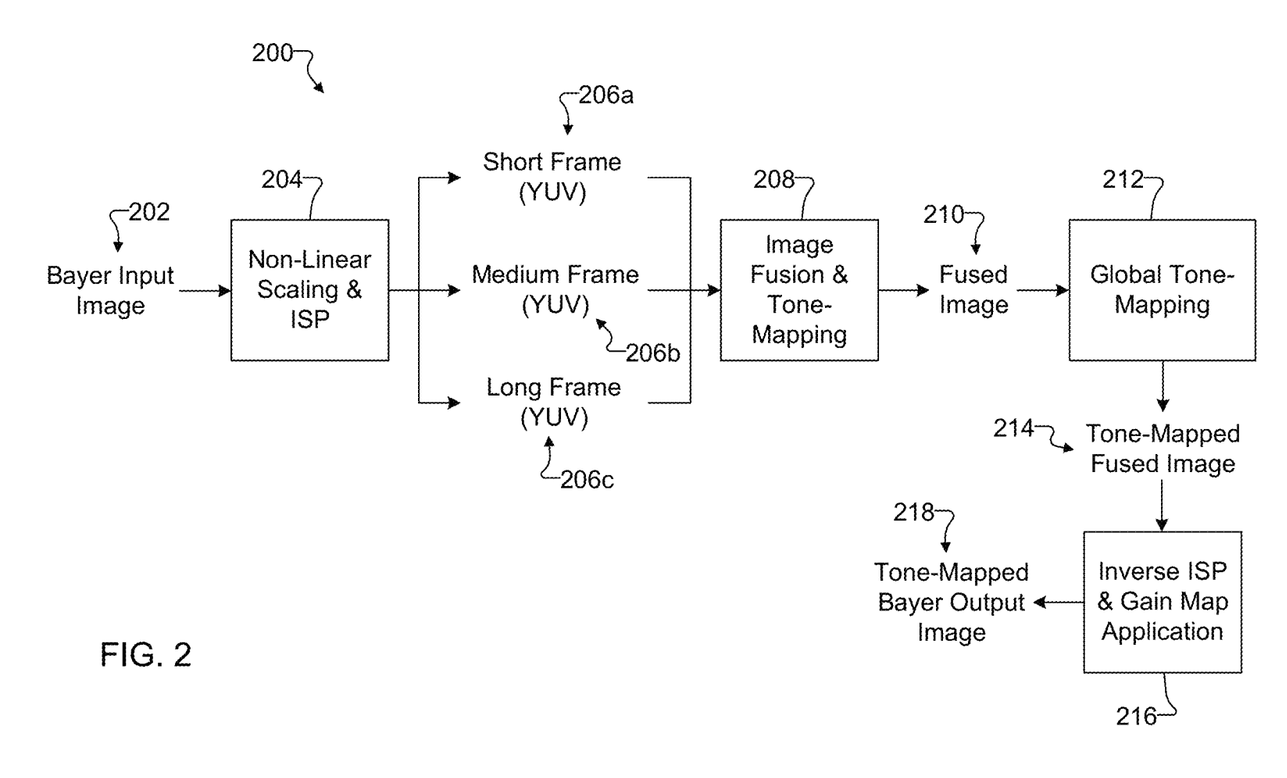
FIG. 2 illustrates an example architecture supporting image generation using non-linear scaling and tone-mapping based on cubic spline curves according to this disclosure.

FIG. 2 illustrates an example architecture 200 supporting image generation using non-linear scaling and tone-mapping based on cubic spline curves according to this disclosure. For ease of explanation, the architecture 200 shown in FIG. 2 is described as being implemented on or supported by the electronic device 101 in the network configuration 100 of FIG. 1. However, the architecture 200 shown in FIG. 2 could be used with any other suitable device and in any other suitable system, such as when the architecture 200 is implemented on or supported by the server 106.

As shown in FIG. 2, the architecture 200 generally operates to receive and process input images, which in this example take the form of one or more Bayer input images 202. Each input image 202 may include or represent any suitable image data. For example, a Bayer input image 202 may typically include sixteen-bit data values or data values of other lengths in red, green, and blue channels. Each input image 202 may also have any suitable resolution, up to and including very high resolutions. Current smartphones, for example, may be used to capture images of up to 64 megapixels or more, although their maximum resolution continues to increase over time.

Figure 3:
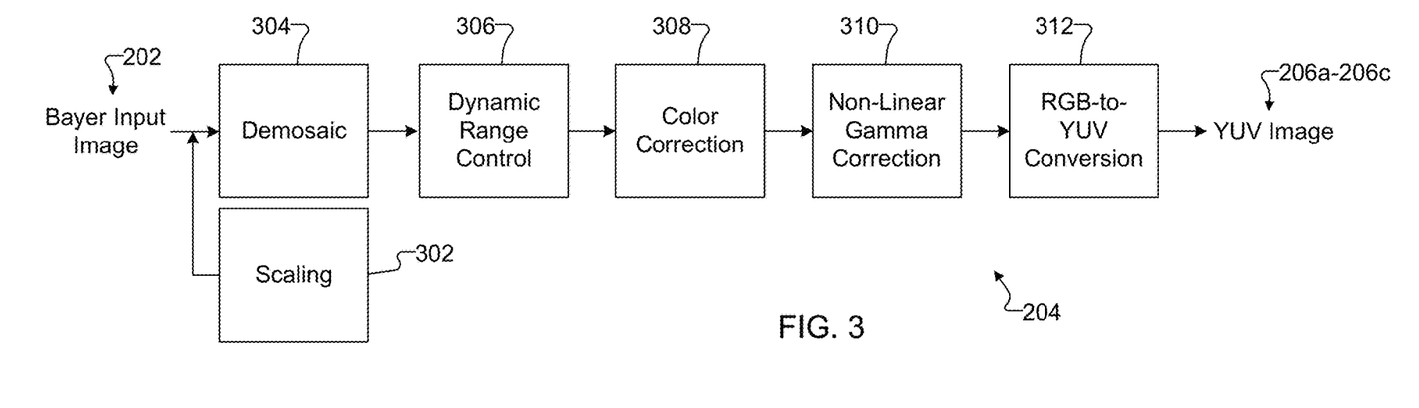
FIG. 3 illustrates an example approach for non-linear scaling during image generation according to this disclosure.

Each Bayer input image 202 is provided to a non-linear scaling and image signal processing (ISP) function 204, which generally operates to convert each Bayer input image 202 into multiple YUV image frames 206a-206c. For example, the non-linear scaling and ISP function 204 may use non-linear curves to scale the image data contained in a Bayer input image 202, such as one non-linear curve to darken the image data and another non-linear curve to brighten the image data. In some embodiments, the non-linear scaling and ISP function 204 uses cubic spline curves to define the non-linear scaling applied to the Bayer input image 202. In particular embodiments, the cubic spline curves may be defined by at least one user, such as by having a user define one or more control points (which can then be used to define a cubic spline curve as described in more detail below). The non-linear scaling and ISP function 204 may also perform various operations to convert scaled versions of the Bayer input image 202 from the Bayer image domain to the YUV image domain. The YUV image domain defines image data using a luminance or luma (Y) channel and two chrominance (U and V) channels. The non-linear scaling and ISP function 204 may perform any suitable operations to scale Bayer input images 202 and generate YUV image frames 206a-206c. One example embodiment of the non-linear scaling and ISP function 204 is shown in FIG. 3, which is described below.

The YUV image frames 206a-206c associated with each Bayer input image 202 generally represent the image data from that Bayer input image 202, where the YUV image frames 206a-206c are associated with different exposure settings. In this example, the YUV image frame 206a is referred to as a "short" frame and is generated using the shortest exposure setting, which typically means that the YUV image frame 206a is the darkest frame among the YUV image frames 206a-206c. The YUV image frame 206c is referred to as a "long" frame and is generated using the longest exposure setting, which typically means that the YUV image frame 206c is the brightest frame among the YUV image frames 206a-206c. The YUV image frame 206b is referred to as a "medium" frame and is generated using an exposure setting between the longest and shortest exposure settings (and may often be generated using an "auto" exposure setting). This typically means that the YUV image frame 206b is brighter than the YUV image frame 206a and darker than the YUV image frame 206c. As described below, the use of non-linear scaling here can help to improve the brightness level of one or more of the YUV image frames 206a-206c, which allows for improved image details to be captured in one of more of the YUV image frames 206a-206c.

The YUV image frames 206a-206c are provided to an image fusion and tone-mapping function 208, which generally operates to blend or otherwise fuse the YUV image frames 206a-206c and apply local tone-mapping to the resulting image in order to produce a fused image 210. For example, the image fusion and tone-mapping function 208 may fuse the YUV image frames 206a-206c by taking a reference frame (such as the YUV image frame 206b) and replacing image content in portions of the reference frame with image content from corresponding portions in one or more non-reference frames (such as the YUV image frames 206a and 206c). As particular examples, the image fusion and tone-mapping function 208 may replace image content in one or more brighter regions of the YUV image frame 206b with image content from the corresponding region(s) of the YUV image frame 206a. This helps to improve image details in the resulting fused image 210 since this replaces image content in one or more over-exposed regions of the YUV image frame 206b with image content associated with a shorter exposure (which is less likely to be over-exposed). Similarly, the image fusion and tone-mapping function 208 may replace image content in one or more darker regions of the YUV image frame 206b with image content from the corresponding region(s) of the YUV image frame 206c. This helps to improve image details in the resulting fused image 210 since this replaces image content in one or more under-exposed regions of the YUV image frame 206b with image content associated with a longer exposure (which is less likely to be under-exposed). In addition, the image fusion and tone-mapping function 208 may apply tone-mapping to help ensure that the fused image 210 has a more consistent tone, which is useful since the fused image 210 may contain image data associated with different exposure settings. The image fusion and tone-mapping function 208 may use any suitable techniques to perform image blending or other image fusion and to perform tone-mapping.

The fused image 210 is provided to a global tone-mapping function 212, which generally operates to perform tone-mapping across the fused image 210 in order to adjust the global brightness and/or the global contrast of the fused image 210 and produce a tone-mapped fused image 214. For example, the global tone-mapping function 212 may use at least one cubic spline curve that defines how tone-mapping is applied across the fused image 210 in order to adjust the global brightness and/or the global contrast of the fused image 210. In particular embodiments, the cubic spline curve(s) may be defined by at least one user, such as by having a user define three or more control points (which can then be used to define a cubic spline curve as described in more detail below). Depending on how the cubic spline curve is defined, the cubic spline curve can be used to provide any suitable adjustments to global brightness and/or global contrast, including fine-tuned adjustments to the global brightness and/or global contrast of the fused image 210 within the middle energy range of the cubic spline curve.

The tone-mapped fused image 214 is provided to an inverse ISP and gain map application function 216, which generally operates to convert the tone-mapped fused image 214 and apply suitable gains to the image data in order to produce a tone-mapped Bayer output image 218. For example, the inverse ISP and gain map application function 216 can convert the tone-mapped fused image 214 (which is in the YUV domain) into another domain (such as the Bayer domain) for further processing or output. The inverse ISP and gain map application function 216 can also apply different gains to different pixels of the tone-mapped fused image 214 or the converted version of the tone-mapped fused image 214. In some embodiments, a gain map can be generated based on the tone-mapped fused image 214, the converted version of the tone-mapped fused image 214, or other data. The gain map may identify the gain to be applied to each pixel of the tone-mapped fused image 214 or the converted version of the tone-mapped fused image 214, and the gains identified in the gain map can be applied to the pixel data of the tone-mapped fused image 214 or the converted version of the tone-mapped fused image 214 in order to adjust the pixel data. The inverse ISP and gain map application function 216 may use any suitable techniques to perform image conversion and to apply gains to image data.

Each tone-mapped Bayer output image 218 corresponds to one of the Bayer input images 202 and (ideally) includes image data having a higher dynamic range than the corresponding Bayer input image 202. Each tone-mapped Bayer output image 218 may include or represent any suitable image data, such as twelve-bit data values or data values of other lengths in red, green, and blue channels. Each tone-mapped Bayer output image 218 may also have any suitable resolution, such as a resolution matching the resolution of the corresponding Bayer input image 202 (although a resolution not matching the resolution of the corresponding Bayer input image 202 may also be used). Each tone-mapped Bayer output image 218 may be stored, output, or used in any suitable manner, such as when displayed on the display 160 of the electronic device 101, stored in a camera "roll" or "album" in the memory 130 of the electronic device 101, or uploaded to a social media platform or other destination(s) via the communication interface 170 of the electronic device 101.

It should be noted that the functions shown in or described with respect to FIG. 2 can be implemented in an electronic device 101, server 106, or other device in any suitable manner. For example, in some embodiments, at least some of the functions shown in or described with respect to FIG. 2 can be implemented or supported using one or more software applications or other software instructions that are executed by the processor 120 of the electronic device 101, server 106, or other device. In other embodiments, at least some of the functions shown in or described with respect to FIG. 2 can be implemented or supported using dedicated hardware components. In general, the functions shown in or described with respect to FIG. 2 can be performed using any suitable hardware or any suitable combination of hardware and software/firmware instructions.

Although FIG. 2 illustrates one example of an architecture 200 supporting image generation using non-linear scaling and tone-mapping based on cubic spline curves, various changes may be made to FIG. 2. For example, various functions shown in FIG. 2 may be combined, further subdivided, replicated, omitted, or rearranged and additional functions may be added according to particular needs. As particular examples, the non-linear scaling and ISP functions may be separated into different functions, the image fusion and tone-mapping functions may be separated into different functions, and/or the inverse ISP and gain application functions may be separated into different functions.

FIG. 3 illustrates an example approach for non-linear scaling during image generation according to this disclosure. More specifically, FIG. 3 illustrates an example implementation of the non-linear scaling and ISP function 204 in the architecture 200 of FIG. 2. Note, however, that the function 204 may be implemented in any other suitable manner.

As shown in FIG. 3, the non-linear scaling and ISP function 204 includes a scaling function 302, which generally operates to scale the image data contained in a Bayer input image 202 prior to conversion of the image data into the YUV domain. For example, the scaling function 302 may multiply the data value of each pixel of the Bayer input image 202 by a specified value (referred to as a "scaling factor") to produce scaled image data. When the scaling factor varies linearly as a function of pixel value, this is referred to as linear scaling. However, as noted above, the non-linear scaling and ISP function 204 supports the use of non-linear scaling, so the scaling factor can vary non-linearly as a function of pixel value. The scaling factors used for scaling the image data of the Bayer input image 202 here can be defined using a non-linear curve, such as a cubic spline curve.

Note that the scaling factors applied by the scaling function 302 will vary here depending on whether the scaled image data of the Bayer input image 202 is being used to produce the "short" YUV image frame 206a, the "medium" YUV image frame 206b, or the "long" YUV image frame 206c. For example, the non-linear curve defining the scaling factors used for the "short" YUV image frame 206a may typically include smaller scaling factors, such as values between zero and about 0.1 or about 0.2. Performing scaling using these values generally causes the image data in the Bayer input image 202 to be scaled to lower (darker) values, causing the resulting "short" YUV image frame 206a to have a lower overall brightness relative to the Bayer input image 202. Conversely, the non-linear curve defining the scaling factors used for the "long" YUV image frame 206c may typically include scaling factors having larger values, such as values between zero and about 2.0. Performing scaling using these values generally causes the image data in the Bayer input image 202 to be scaled to larger (brighter) values, causing the resulting "long" YUV image frame 206c to have a higher overall brightness relative to the Bayer input image 202. The non-linear curve defining the scaling factors used for the "medium" YUV image frame 206c may typically cause the resulting "medium" YUV image frame 206b to have an equal or similar overall brightness relative to the Bayer input image 202.

Each scaled version of the Bayer input image 202 is processed using a demosaic function 304, a dynamic range control (DRC) function 306, a color correction function 308, a non-linear gamma correction function 310, and a red-green-blue (RGB)-to-YUV conversion function 312. The demosaic function 304 generally operates to convert the image data of a scaled version of the Bayer input image 202 from the Bayer domain into the RGB domain. For example, the image data contained in the scaled version of the Bayer input image 202 typically includes a single data value per pixel, where each pixel is associated with a specific color (such as red, green, or blue) and where different pixels are associated with different colors. Also, when a Bayer color filter is used during image capture, approximately twice as many pixels may capture image data using green filters compared to pixels that capture image data using red or blue filters. The demosaic function 304 can perform averaging operations for the green pixel data and interpolation operations for the red and blue image data in order to reconstruct image data for each pixel in each color channel, such as by generating a data value for every pixel in the red channel, a data value for every pixel in the green channel, and a data value for every pixel in the blue channel. In this way, the demosaic function 304 generates full image data in each color channel. The demosaic function 304 may use any suitable technique to generate RGB image data using an input image.

The DRC function 306 generally operates to apply gain corrections to the output of the demosaic function 304, thereby adjusting the dynamic range of the image data output from the demosaic function 304. For example, the DRC function 306 may access or use a lookup table having different gain values that can be applied to pixels having different data values. As a particular example, the lookup table may indicate that larger gain values are to be applied to pixels of lower intensities and smaller gain values or no gains are to be applied to pixels of higher intensities. The DRC function 306 may use any suitable technique to apply gains in order to increase the dynamic range of image data.

The color correction function 308 generally operates to apply color correction to the output of the DRC function 306, thereby adjusting the colors represented by the image data output from the DRC function 306. For example, the color correction function 308 may apply a color correction matrix (CCM) to the image data output from the DRC function 306 to adjust the colors represented by the image data. The color correction matrix is often generated during calibration of an electronic device using a 3×3 arrangement or other arrangement of tiles having specific known colors. The application of the color correction matrix to the image data output from the DRC function 306 can help to improve color reproduction by the electronic device. The color correction function 308 may use any suitable technique to perform color correction on image data.

The non-linear gamma correction function 310 generally operates to apply gamma correction to the output of the color correction function 308, thereby adjusting the image data output from the color correction function 308 in order to simulate how light and color are perceived by the human eye. For example, the human eye may have more sensitivity to differences between darker areas of an image and less sensitivity to differences between brighter areas of the image. As a result, the non-linear gamma correction function 310 may allocate more bandwidth for darker data values in the image data and less bandwidth for brighter data values in the image data. The non-linear gamma correction function 310 may also compress the image data output from the color correction function 308, such as from sixteen-bit data values to twelve-bit data values. The non-linear gamma correction function 310 may use any suitable technique to perform gamma correction on image data.

The RGB-to-YUV conversion function 312 generally operates to convert image data from the RGB domain to the YUV domain. For example, the RGB-to-YUV conversion function 312 can process the image data output from the non-linear gamma correction function 310 in the red, green, and blue channels in order to convert that image data into corresponding image data in Y, U, and V channels. The RGB-to-YUV conversion function 312 may use any suitable technique to convert image data from the RGB domain into the YUV domain.

Although FIG. 3 illustrates one example of an approach for non-linear scaling during image generation, various changes may be made to FIG. 3. For example, various functions shown in FIG. 3 may be combined, further subdivided, replicated, omitted, or rearranged and additional functions may be added according to particular needs.

Figure 4:
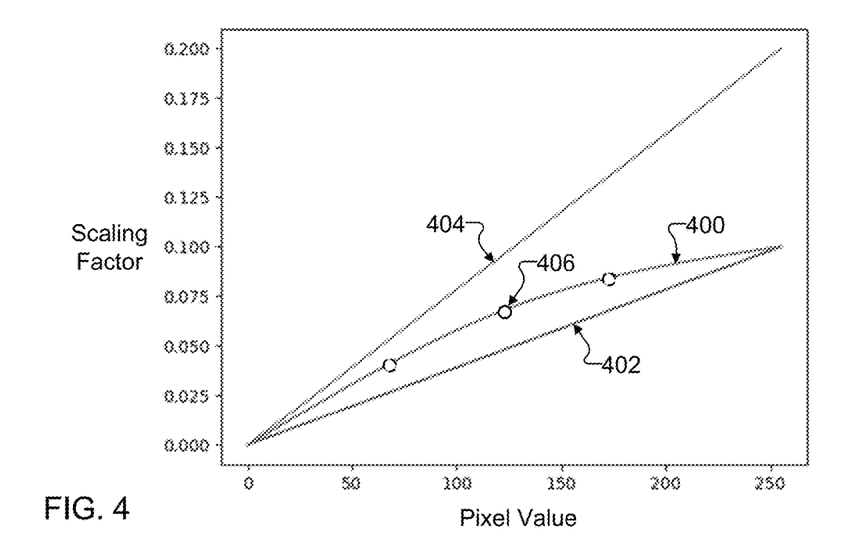
FIG. 4 illustrates an example curve used for non-linear scaling during image generation according to this disclosure.

FIG. 4 illustrates an example curve 400 used for non-linear scaling during image generation according to this disclosure. For example, the curve 400 shown in FIG. 4 may be used by the scaling function 302 of the non-linear scaling and ISP function 204 during image generation. Note, however, that the curve 400 shown here is for illustration only and that the scaling function 302 may use any other suitable non-linear curve for scaling image data.

As shown in FIG. 4, the curve 400 plots how different scaling factors can be applied to pixels having different data values. The curve 400 here is non-linear and may represent a portion of a cubic spline function or other non-linear function. The curve 400 indicates that the scaling factors increase non-linearly relative to the data values of the pixels. Also plotted are two linear curves 402 and 404 for comparison, where the linear curve 402 indicates that the scaling factors increase linearly from zero to about 0.1 and the linear curve 404 indicates that the scaling factors increase linearly from zero to about 0.2. Note that the curve 400 here may be used to generate the "short" YUV image frame 206a since the scaling factors represented by the curve 400 would lower pixel values being scaled and result in a darker overall image. A similar type of curve may be used to generate the "long" YUV image frame 206c, but that curve would associate a larger range of scaling factors (such as zero to about 2.0) with the range of pixel data values. A linear or non-linear curve may or may not be used to scale the pixel values used to produce the "medium" YUV image frame 206b.

To achieve improved HDR effects when fusing the YUV frames 206a-206c, smaller scaling factors may be used when generating the "short" YUV image frame 206a. However, this may lead to the creation of visible artifacts in a blended or fused image. For example, if the YUV frames 206a-206c capture a portion of the sky with the sun, the portion of the "short" YUV image frame 206a that includes the sun would typically be used in the fused image 210. This is because the "short" YUV image frame 206a has the shortest exposure and therefore is the least likely to be over-exposed in that portion of the scene being imaged. However, this may cause part of the sky around the sun in the fused image to be darker than other portions of the sky, which may be taken from the "medium" YUV image frame 206b or from the "long" YUV image frame 206c.

The use of non-linear scaling can help to reduce or avoid the creation of these types of artifacts or other types of artifacts. Using the curve 400 shown in FIG. 4, for example, the image data used to generate the "short" YUV image frame 206a can be scaled so that the "short" YUV image frame 206a is brighter than what would be obtained using the curve 402. Even though the "short" YUV image frame 206a may not be quite as bright as what would be obtained using the curve 404, the fused image 210 generated using the "short" YUV image frame 206a produced via non-linear scaling may have fewer artifacts than a fused image generated using a YUV frame produced via the curve 404.

In some embodiments, the curve 400 used for non-linear scaling by the non-linear scaling and ISP function 204 may be user-defined. For example, a user may define one or more control points 406, and the curve 400 may be fit onto the one or more control points 406. As a particular example, the user may be presented with the curve 402, and the user may select one or more control points 406 that cause the curve 402 to be modified so as to travel through or near the one or more control points 406. In some cases, the user may only need to identify a single control point 406 in order for the curve 400 to be successfully generated. In other cases, the user may identify multiple control points 406, such as to more finely-tune the curve 400.

It should be noted here that the example curve 400 shown in FIG. 4 travels above the curve 402, which indicates that application of the curve 400 by the scaling function 302 would result in the generation of brighter image data compared to image data generated using the curve 402. However, the curve 400 may instead travel below the curve 402, and application of such a curve 400 by the scaling function 302 would result in the generation of darker image data compared to image data generated using the curve 402.

Although FIG. 4 illustrates one example of a curve 400 used for non-linear scaling during image generation, various changes may be made to FIG. 4. For example, the actual shape of the curve 400 used for non-linear scaling can vary as needed or desired. As a particular example, the shape of the curve 400 in some cases can be defined by the one or more specific control points 406 selected by a user, thereby controlling how non-linear scaling is used to adjust pixel data values.

Figure 5:
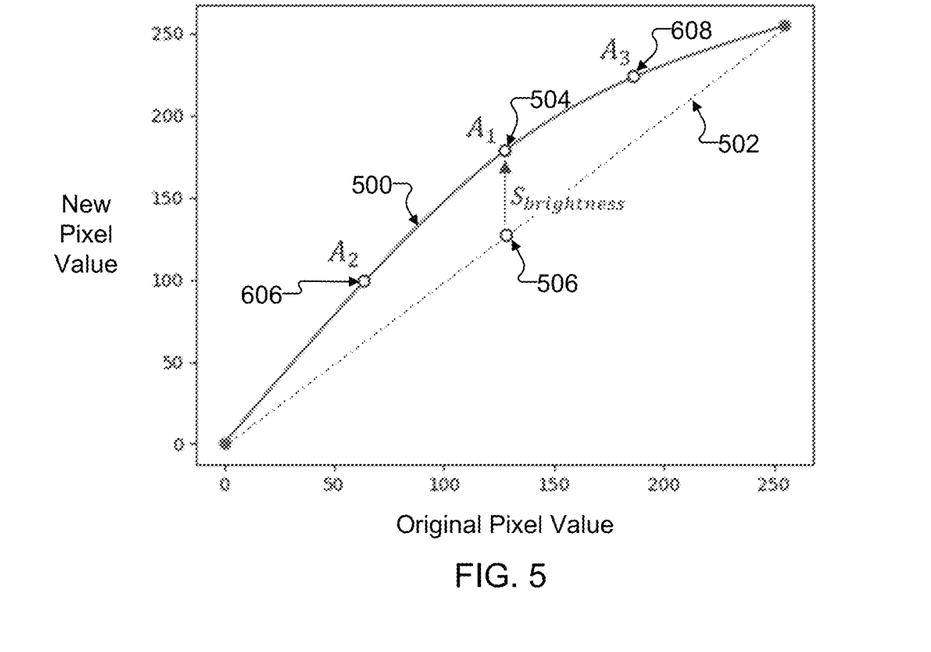
FIGS. 5 and 6 illustrate example curves used for global tone-mapping during image generation according to this disclosure.
Figure 6:
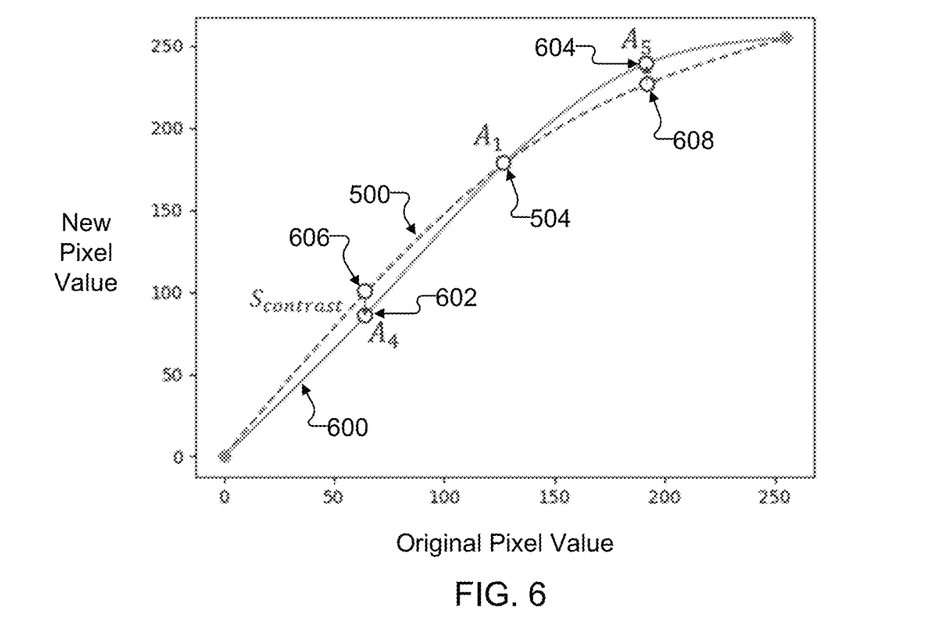

FIGS. 5 and 6 illustrate example curves 500 and 600 used for global tone-mapping during image generation according to this disclosure. As noted above, the global tone-mapping function 212 generally operates to adjust the global brightness and/or global contrast of the fused image 210 in order to produce the tone-mapped fused image 214. In some embodiments, the global tone-mapping function 212 can use a non-linear curve to perform the tone-mapping. For example, the global tone-mapping function 212 may operate to replace various pixel data values in the fused image 210 with other data values as defined by the non-linear curve in order to produce the tone-mapped fused image 214. Each curve 500 and 600 shown in FIGS. 5 and 6 represents one example of a cubic spline curve that associates original pixel data values (in the fused image 210) with new pixel data values (in the tone-mapped fused image 214) and that may be used by the global tone-mapping function 212.

As shown in FIG. 5, the curve 500 plots how different original pixel data values can be mapped to or replaced with new pixel data values, where the curve 500 is used by the global tone-mapping function 212 for global brightness control. The curve 500 here is non-linear and may represent a portion of a cubic spline function or other non-linear function. Also plotted is a linear curve 502 for comparison, where the linear curve 502 indicates that the original pixel data values match the new pixel data values. In this particular example, the curve 500 is positioned above the curve 502, which indicates that application of the curve 500 by the global tone-mapping function 212 would result in the generation of brighter image data compared to image data generated using the curve 502. However, the curve 500 may instead travel below the curve 502, and application of such a curve 500 by the global tone-mapping function 212 would result in the generation of darker image data compared to image data generated using the curve 502.

In some embodiments, the curve 500 used by the global tone-mapping function 212 may be user-defined. For example, a user may define a brightness parameter (denoted $S_{brightness}$) that is used to define a control point 504. As a particular example, the brightness parameter $S_{brightness}$ can be used to calculate the position of the control point 504 based on the position of a corresponding point 506 on the curve 502. In particular embodiments, the position of the control point 504 may be determined as follows:

$$A_1:[0.5, 0.5+0.2 \times S_{brightness}], S_{brightness} \in [-1,1] \quad (1)$$

The value "0.5" in Equation (1) is associated with the point 506 on the curve 502 and assumes that the point 506 is positioned at the midpoint of the curve 502 and that the curve 502 has a slope of one. The value "0.2" in Equation (1) is used to scale the brightness parameter $S_{brightness}$. Note that both of these values can vary depending on the implementation. Equation (1) identifies the position of the control point 504 as being higher or lower than the corresponding point 506 on the curve 502 depending on the value of the brightness parameter $S_{brightness}$, which can have a value between −1 and +1.

As shown in FIG. 6, the curve 600 plots how different original pixel data values can be mapped to or replaced with new pixel data values, where the curve 600 is used by the global tone-mapping function 212 for global brightness control and global contrast control. The curve 600 here is non-linear and may represent a portion of a cubic spline function or other non-linear function. Also plotted is the curve 500 so that adjustments to the curve 500 used to achieve global contrast control can be illustrated. In some embodiments, the curve 600 used by the global tone-mapping function 212 may be user-defined. For example, a user may define a contrast parameter (denoted $S_{contrast}$) that is used to define control points 602 and 604. As a particular example, the contrast parameter $S_{contrast}$ can be used to calculate the positions of the control points 602 and 604 based on positions of corresponding points 606 and 608 on the curve 500. In particular embodiments, the positions of the control points 602 and 604 may be determined as follows:

$$A_4:A_2-[0, 0.2 \times S_{contrast}], S_{contrast} \in [-1,1] \quad (2)$$

$$A_5:A_3-[0, 0.2 \times S_{contrast}], S_{contrast} \in [-1,1] \quad (3)$$

Again, the value "0.2" in Equations (2) and (3) is used to scale the contrast parameter $S_{contrast}$ and can vary depending on the implementation. Equations (2) and (3) identify the positions of the control points 602 and 604 as being higher or lower than the corresponding points 606 and 608 on the curve 500 depending on the value of the contrast parameter $S_{contrast}$, which can have a value between −1 and +1. During the identification of the control points 602 and 604, the control point 504 can remain fixed.

Note that, in the specific example shown in FIG. 6, the curve 500 may be adjusted in order to produce the curve 600. In embodiments such as these, the curve 600 could be used for both global brightness adjustments and global contrast adjustments (since the curve 600 incorporates the global brightness adjustments represented by the curve 500). Alternatively, in other embodiments, the curve 600 may be produced by adjusting a different curve (such as the linear curve 502), in which case the curve 600 could be used for global contrast adjustments without also being used for global brightness adjustments.

As can be seen with reference to FIGS. 5 and 6, it may be very easy for a user to define or adjust a curve that is used for global brightness control and/or global contrast control. Among other reasons, a cubic spline curve may be used to represent a non-linear curve that is used to adjust image brightness and/or image contrast. However, unlike gamma curves (which may focus energy in darker or brighter regions and cause haziness or reduced contrast), a cubic spline curve is more flexible and can be easily adjusted. This allows various arbitrary non-linear curves to be generated and used for global brightness control and/or global contrast control. In some embodiments as noted above, a user may only need to specify one or two numerical parameters ($S_{brightness}$ and/or $S_{contrast}$) in order for a suitable non-linear curve to be generated.

Although FIGS. 5 and 6 illustrate examples of curves 500 and 600 used for global tone-mapping during image generation, various changes may be made to FIGS. 5 and 6. For example, the actual shape of the curve 500 or 600 used for global tone-mapping can vary as needed or desired. As a particular example, the shape of the curve 500 or 600 in some cases can be defined by one or more parameters selected by a user, thereby controlling how global tone-mapping is used to adjust the pixel data values. Also, for the curve 600 shown in FIG. 6, it is assumed that the adjustments to the curve 600 relative to the curve 500 are symmetrical, meaning the parameter $S_{contrast}$ is applied equally but in opposite directions on the left and right sides. However, the adjustments to the curve 600 relative to the curve 500 or other curve may be asymmetrical, such as when one parameter $S_{contrast\_1}$ is used in Equation (2) and a different parameter $S_{contrast\_2}$ is used in Equation (3). In addition, note that the number of control points used in FIGS. 5 and 6 can vary, such as when more control points are used to define the curve 500 or 600 in order to achieve more flexible control of the curve shape.

Figure 7:
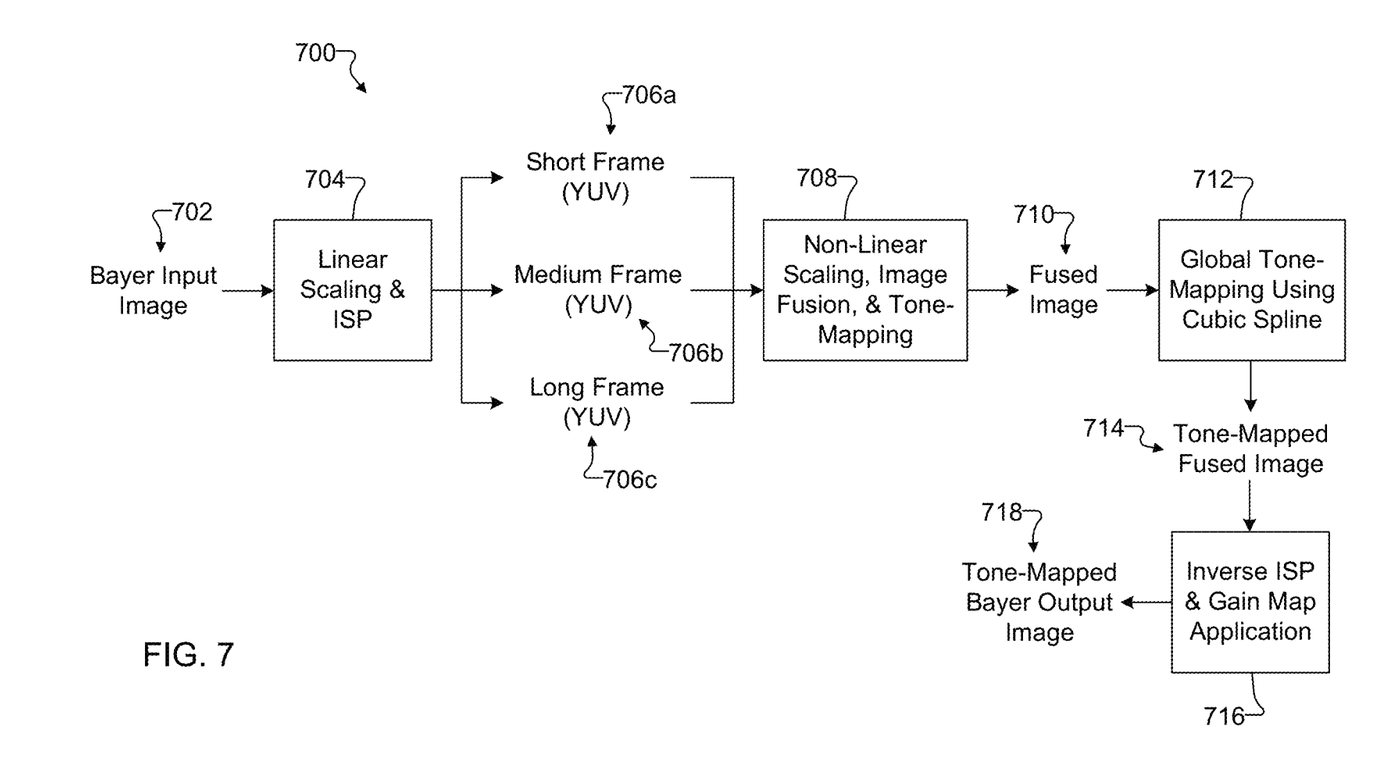
FIG. 7 illustrates another example architecture supporting image generation using non-linear scaling and tone-mapping based on cubic spline curves according to this disclosure.

FIG. 7 illustrates another example architecture 700 supporting image generation using non-linear scaling and tone-mapping based on cubic spline curves according to this disclosure. For ease of explanation, the architecture 700 shown in FIG. 7 is described as being implemented on or supported by the electronic device 101 in the network configuration 100 of FIG. 1. However, the architecture 700 shown in FIG. 7 could be used with any other suitable device and in any other suitable system, such as when the architecture 700 is implemented on or supported by the server 106.

As shown in FIG. 7, the architecture 700 includes many elements that may be the same as or similar to corresponding elements in FIG. 2. In this example, the architecture 700 can receive a Bayer input image 702 and use a linear scaling and ISP function 704 to produce YUV image frames 706a-706c. A non-linear scaling, image fusion, and tone-mapping function 708 can fuse the YUV image frames 706a-706c and apply tone-mapping to generate a fused image 710. A global tone-mapping function 712 can adjust the global brightness and/or global contrast of the fused image 710 to produce a tone-mapped fused image 714. An inverse ISP and gain application function 716 can convert the fused image 710 back into the Bayer domain and apply suitable gains in order to produce a tone-mapped Bayer output image 718.

Unlike the architecture 200 of FIG. 2, the architecture 700 performs non-linear scaling in the YUV domain rather than the Bayer domain. As a result, the function 704 may include a scaling function 302 that applies linear scaling to the Bayer input image 702 in order to generate one or more of the YUV image frames 706a-706c. For example, the function 704 may include a scaling function 302 that uses the curve 402 or 404 to scale image data and generate the "short" YUV image frame 706a, and the scaling function 302 may use a similar type of linear curve to scale image data and generate the "long" YUV image frame 706c. A linear curve may or may not be used to generate the "medium" YUV image frame 706b. Also, the function 708 here can apply non-linear scaling to the initial YUV image frames 706a-706c during generation of the fused image 710, such as by applying the non-linear scaling to the initial YUV image frames 706a-706c in order to produce additional YUV image frames (which are then fused). As a particular example, the function 708 may include a scaling function 302 that applies non-linear scaling to scale the YUV image frames 706a-706c prior to fusing and tone-mapping.

Although FIG. 7 illustrates another example of an architecture 700 supporting image generation using non-linear scaling and tone-mapping based on cubic spline curves, various changes may be made to FIG. 7. For example, various functions shown in FIG. 7 may be combined, further subdivided, replicated, omitted, or rearranged and additional functions may be added according to particular needs. As particular examples, the linear scaling and ISP functions may be separated into different functions, the non-linear scaling, image fusion, and tone-mapping functions may be separated into different functions, and/or the inverse ISP and gain application functions may be separated into different functions.

Figure 8A:
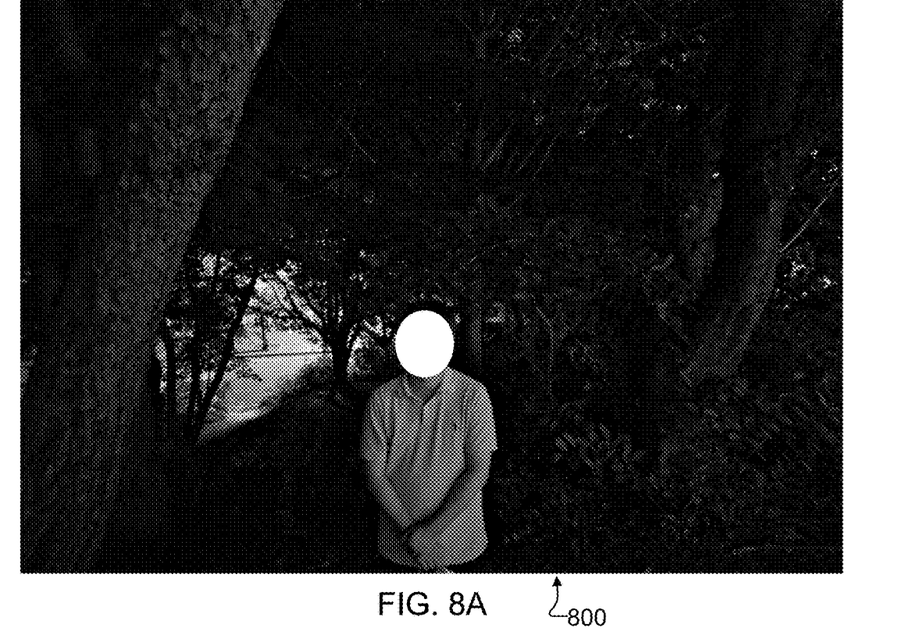
FIGS. 8A and 8B illustrate example results that may be obtained using non-linear scaling and tone-mapping based on cubic spline curves during image generation according to this disclosure.
Figure 8B:
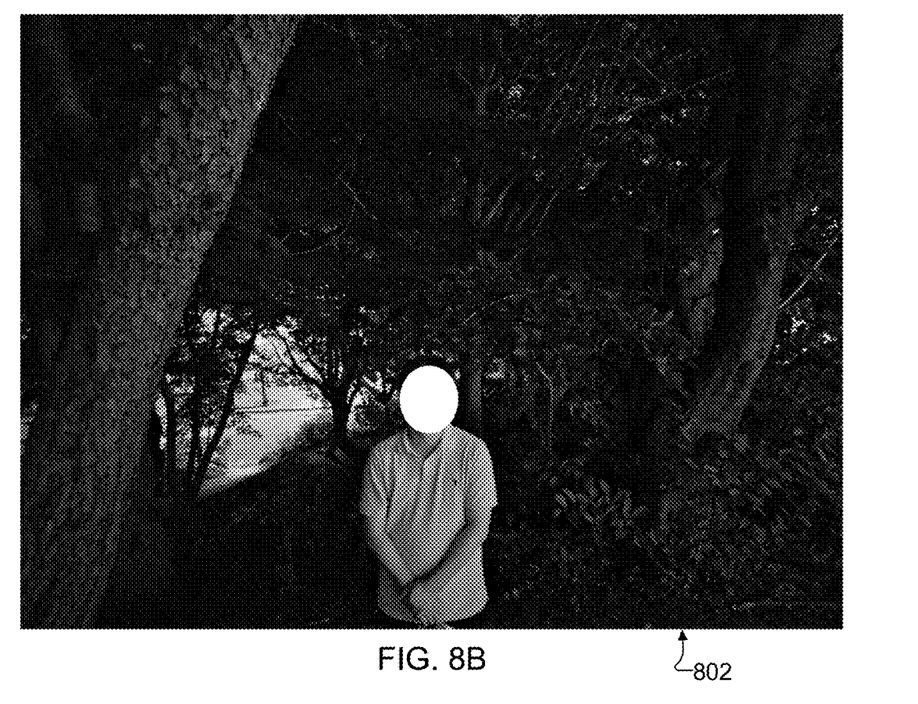

FIGS. 8A and 8B illustrate example results that may be obtained using non-linear scaling and tone-mapping based on cubic spline curves during image generation according to this disclosure. More specifically, FIGS. 8A and 8B depict a comparison between an image 800 of a scene captured using conventional image processing and an image 802 of the same scene captured using one of the embodiments described above. In this particular example, the images 800 and 802 capture a darker scene with a person in the foreground. In the images 800 and 802, the person's face has been obscured for privacy.

Because the scene being imaged here is darker, the architecture 200 or 700 may typically attempt to use the "long" YUV image frame 206c or 706c to try and recover image details for darker regions of the scene. This is because the "long" YUV image frame 206c or 706c is associated with a longer exposure setting, which ideally allows more image details to be captured of the darker scene. As can be seen here, the image 802 includes more image details in the darker areas of the scene, and the person appears brighter within the darker scene. This indicates that the techniques described above for non-linear scaling and global tone-mapping can be used to produce images having improved quality.

Although FIGS. 8A and 8B illustrate one example of results that may be obtained using non-linear scaling and tone-mapping based on cubic spline curves, various changes may be made to FIGS. 8A and 8B. For example, images can be captured of numerous scenes under different lighting conditions, and these figures do not limit the scope of this disclosure. These figures are merely meant to illustrate example types of benefits that might be obtainable using the techniques described above. As a particular example, improvements in image quality can also be obtained when capturing images of bright scenes, in which case the architecture 200 or 700 may typically attempt to use the "short" YUV image frame 206a or 706a to try and recover image details for the brighter regions of the scene. This is because the "short" YUV image frame 206a or 706a is associated with a shorter exposure setting, which ideally allows more image details to be captured of the brighter scene.

Figure 9:
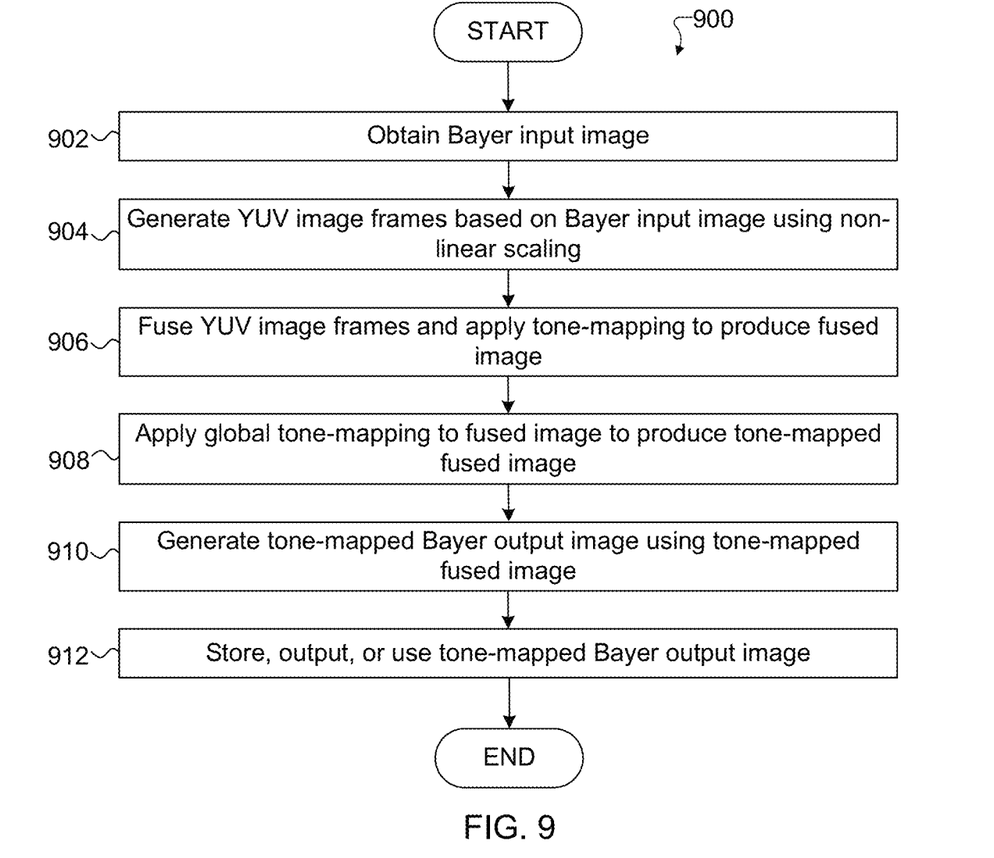
FIG. 9 illustrates an example method for image generation using non-linear scaling and tone-mapping based on cubic spline curves according to this disclosure.

FIG. 9 illustrates an example method 900 for image generation using non-linear scaling and tone-mapping based on cubic spline curves according to this disclosure. For ease of explanation, the method 900 is described as being used by the electronic device 101 in the network configuration 100, where the electronic device 101 supports the architecture 200 of FIG. 2 or the architecture 700 of FIG. 7. However, the method 900 may be performed using any other suitable device and in any other suitable system.

As shown in FIG. 9, a Bayer input image is obtained at step 902. This could include, for example, the processor 120 of the electronic device 101 receiving a capture request and causing a camera (sensor 180) to capture a Bayer input frame 202 or 702. The Bayer input frame 202 or 702 may be captured as a single image or as part of a larger capture operation, such as during rapid image capture or during video capture.

Multiple YUV image frames are generated based on the Bayer input image using non-linear scaling at step 904. This could include, for example, the processor 120 of the electronic device 101 performing the function 204 or 704 to convert the Bayer input image 202 or 702 from the Bayer domain to the YUV domain. This could also include the processor 120 of the electronic device 101 performing the function 204 to apply non-linear scaling to the Bayer input image 202 prior to conversion into the YUV domain or performing the function 708 to apply non-linear scaling to YUV images after conversion into the YUV domain. In some embodiments, the non-linear scaling that is applied here may be defined using a cubic spline curve. In particular embodiments, the cubic spline curve or other non-linear curve may be defined by a user, such as based on an identification of one or more control points 406.

The YUV image frames are fused and tone-mapping is applied to produce a fused image at step 906. This could include, for example, the processor 120 of the electronic device 101 performing the function 208 or 708 to fuse the YUV image frames 206a-206c or 706a-706c and apply local tone-mapping in order to generate a fused image 210. As discussed above, the fusion here may insert one or more portions of the YUV image frame(s) 206a, 206c, 706a, 706c into the YUV image frame 206b, 706b depending on whether one or more corresponding portions in the YUV image frame 206b, 706b are over-exposed or under-exposed.

Global tone-mapping is applied to the fused image in order to generate a tone-mapped fused image at step 908. This could include, for example, the processor 120 of the electronic device 101 performing the global tone-mapping function 212 or 712 to apply global brightness adjustment and/or global contrast adjustment to the fused image 210 in order to produce the tone-mapped fused image 214. In some embodiments, at least one non-linear curve, such as at least one cubic spline curve, may be used to perform the global brightness adjustment and/or the global contrast adjustment. In particular embodiments, the cubic spline curve or other non-linear curve may be defined by a user, such as based on an identification of one or two parameters ($S_{brightness}$ and/or $S_{ccontrast}$).

A tone-mapped Bayer output image is generated using the tone-mapped fused image at step 910. This could include, for example, the processor 120 of the electronic device 101 performing the function 216 or 716 to convert the tone-mapped fused image 214 or 714 from the YUV domain back to the Bayer domain. This could also include the processor 120 of the electronic device 101 performing the function 216 or 716 to generate a gain map and apply various gains from the gain map in order to produce the tone-mapped Bayer output image 218 or 718.

The tone-mapped Bayer output image can be stored, output, or used at step 912. This could include, for example, the processor 120 of the electronic device 101 displaying the tone-mapped Bayer output image 218 or 718 on the display 160 of the electronic device 101. This could also or alternatively include the processor 120 of the electronic device 101 storing the tone-mapped Bayer output image 218 or 718 in a camera roll or camera album in the memory 130 of the electronic device 101. This could also or alternatively include the processor 120 of the electronic device 101 uploading the tone-mapped Bayer output image 218 or 718 to a social media platform or other destination(s) via the communication interface 170 of the electronic device 101. In general, the tone-mapped Bayer output image may be used in any suitable manner once generated.

Although FIG. 9 illustrates one example of a method 900 for image generation using non-linear scaling and tone-mapping based on cubic spline curves, various changes may be made to FIG. 9. For example, while shown as a series of steps, various steps in FIG. 9 may overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:
1. A method comprising:
    obtaining a Bayer input image;
    generating, using at least one processing device of an electronic device, multiple YUV image frames based on the Bayer input image using non-linear scaling, the YUV image frames associated with different exposure settings;
    generating, using the at least one processing device of the electronic device, a fused image based on the YUV image frames; and
    applying, using the at least one processing device of the electronic device, global tone-mapping to the fused image in order to generate a tone-mapped fused image, wherein the global tone-mapping is based on a first cubic spline curve.

2. The method of claim 1, wherein:
generating the YUV image frames using the non-linear scaling comprises applying scaling factors defined by a non-linear curve to image data in order to produce scaled image data; and
the scaling factors cause the scaled image data in a middle energy range of the non-linear curve to be brighter or darker than if the image data is scaled using scaling factors defined by a linear curve.

3. The method of claim 1, wherein generating the YUV image frames using the non-linear scaling comprises applying scaling factors defined by a second cubic spline curve.

4. The method of claim 3, further comprising:
receiving user input defining one or more control points, the second cubic spline curve generated based on the one or more control points.

5. The method of claim 1, further comprising:
receiving user input defining one or more numerical parameters associated with at least one of: a brightness adjustment and a contrast adjustment, the first cubic spline curve generated based on the one or more numerical parameters.

6. The method of claim 1, wherein generating the YUV image frames using the non-linear scaling comprises applying the non-linear scaling to one of:
image data from the Bayer input image after conversion from a Bayer domain to a YUV domain; or
image data from one or more initial YUV image frames.

7. The method of claim 1, wherein generating the fused image based on the YUV image frames comprises performing an image fusion and tone-mapping operation.

8. The method of claim 1, further comprising:
converting the tone-mapped fused image into a tone-mapped Bayer output image.

9. An apparatus comprising:
at least one processing device configured to:
obtain a Bayer input image;
generate multiple YUV image frames based on the Bayer input image using non-linear scaling, the YUV image frames associated with different exposure settings;
generate a fused image based on the YUV image frames; and
apply global tone-mapping to the fused image in order to generate a tone-mapped fused image, wherein the global tone-mapping is based on a first cubic spline curve.

10. The apparatus of claim 9, wherein:
to generate the YUV image frames using the non-linear scaling, the at least one processing device is configured to apply scaling factors defined by a non-linear curve to image data in order to produce scaled image data; and
the scaling factors are configured to cause the scaled image data in a middle energy range of the non-linear curve to be brighter or darker than if the image data is scaled using scaling factors defined by a linear curve.

11. The apparatus of claim 9, wherein, to generate the YUV image frames using the non-linear scaling, the at least one processing device is configured to apply scaling factors defined by a second cubic spline curve.

12. The apparatus of claim 11, wherein the at least one processing device is further configured to receive user input defining one or more control points, the second cubic spline curve generated based on the one or more control points.

13. The apparatus of claim 9, wherein the at least one processing device is further configured to receive user input defining one or more numerical parameters associated with at least one of: a brightness adjustment and a contrast adjustment, the first cubic spline curve generated based on the one or more numerical parameters.

14. The apparatus of claim 9, wherein, to generate the YUV image frames using the non-linear scaling, the at least one processing device is configured to apply the non-linear scaling to one of:
image data from the Bayer input image after conversion from a Bayer domain to a YUV domain; or
image data from one or more initial YUV image frames.

15. The apparatus of claim 9, wherein the at least one processing device is further configured to convert the tone-mapped fused image into a tone-mapped Bayer output image.

16. A non-transitory computer readable medium containing instructions that when executed cause at least one processor of an electronic device to:
obtain a Bayer input image;
generate multiple YUV image frames based on the Bayer input image using non-linear scaling, the YUV image frames associated with different exposure settings;
generate a fused image based on the YUV image frames; and
apply global tone-mapping to the fused image in order to generate a tone-mapped fused image, wherein the global tone-mapping is based on a first cubic spline curve.

17. The non-transitory computer readable medium of claim 16, wherein:
the instructions that when executed cause the at least one processor to generate the YUV image frames using the non-linear scaling comprise:
instructions that when executed cause the at least one processor to apply scaling factors defined by a non-linear curve to image data in order to produce scaled image data; and
the scaling factors are configured to cause the scaled image data in a middle energy range of the non-linear curve to be brighter or darker than if the image data is scaled using scaling factors defined by a linear curve.

18. The non-transitory computer readable medium of claim 16, wherein the instructions that when executed cause the at least one processor to generate the YUV image frames using the non-linear scaling comprise:
instructions that when executed cause the at least one processor to apply scaling factors defined by a second cubic spline curve.

19. The non-transitory computer readable medium of claim 18, further containing instructions that when executed cause the at least one processor to:
receive first user input defining one or more numerical parameters associated with at least one of: a brightness adjustment and a contrast adjustment, the first cubic spline curve generated based on the one or more numerical parameters; and
receive second user input defining one or more control points, the second cubic spline curve generated based on the one or more control points.

20. The non-transitory computer readable medium of claim 16, further containing instructions that when executed cause the at least one processor to convert the tone-mapped fused image into a tone-mapped Bayer output image.

* * * * *